United States Patent [19]

Garbe

[11] 3,966,539

[45] June 29, 1976

[54] PROCESS FOR EXTRACTING DISSOLVED SALTS FROM WATER

[75] Inventor: Carl W. Garbe, San Carlos, Calif.

[73] Assignee: Dames & Moore, San Francisco, Calif.

[22] Filed: Feb. 22, 1974

[21] Appl. No.: 444,640

[52] U.S. Cl. ............................ 159/47 R; 23/293 R; 23/298; 23/303; 159/1 S; 159/49
[51] Int. Cl.² ...................... B01D 1/00; B01D 9/02; C01D 3/00
[58] Field of Search ............... 23/272 AH, 293, 298, 23/303; 159/49, 1 S, 1 G, 47, 44; 203/10; 61/1, 55, 56

[56] References Cited
UNITED STATES PATENTS

| | | | |
|---|---|---|---|
| 2,987,380 | 6/1961 | Brumbaugh et al. | 23/272 AH X |
| 3,290,231 | 12/1966 | Ries, Jr. et al. | 159/1 S UX |
| 3,456,708 | 7/1969 | Jansson et al. | 159/44 UX |
| 3,640,850 | 2/1972 | Smith, Jr. et al. | 159/25 R |
| 3,718,003 | 2/1973 | Cook et al. | 61/35 |
| 3,801,474 | 4/1974 | Castellucci et al. | 159/1 S X |

*Primary Examiner*—Morris O. Wolk
*Assistant Examiner*—Michael S. Marcus
*Attorney, Agent, or Firm*—Townsend and Townsend

[57] ABSTRACT

Evaporation of water from a salt-saturated liquid is facilitated by adding a particulate solid having a density greater than that of the saturated liquid, and by maintaining a thin surface layer of liquid by settlement of the solids to leave an optimum one to two mils thickness of said layer.

Agitation is employed to restore the optimum thin layer, as required to overcome excessive settling or too rapid evaporation of the thin layer, referred to respectively, as a heavy layer of liquid, or a dry surface skin.

10 Claims, No Drawings

PROCESS FOR EXTRACTING DISSOLVED SALTS FROM WATER

This invention relates to the extraction of dissolved salts from water, and more particularly relates to the process for forming a slurry out of salt-saturated water and solid particles and thereafter using the improved evaporation rate of a slurry to effect increasing saturation of the water with the dissolved salt i.e., increasing salt concentration in the water.

SUMMARY OF THE PRIOR ART

Heretofore, the evaporation of water from dissolved salts has occurred in large ponds. Typically, these ponds are sequentially and progressively decanted to adjacent ponds dependent upon their state of saturation. This successive decantation continues until the salt precipitates from solution.

These conventional settling ponds include many disadvantages. First and foremost, process occupies large areas of otherwise highly desirable land. Second, the ponds, because of their area and their unnatural saturation of salt, interfere with the ambient ecology of the environment. Finally, the length of time required is dependent upon the local pan evaporative rate. In areas where the natural evaporative rate does not significantly exceed the annual rainfall, the process of evaporative saturation and subsequent solidifying of dissolved salts is not feasible.

SUMMARY OF THE INVENTION

I have discovered that water evaporates rapidly from thin films, which I believe to be in the range of 1 to 2 mils thickness, which can be developed over a mixture of suspended solids in water. According to this process, a particulate solid is selected having a density which exceeds that of the salt-saturated liquid and preferably exceeds the density of the salt-saturated liquid by a factor of about 2.0. The solid particulate matter is then mixed with the salt-containing solution to form a slurry. The slurry is thereafter deposited with the surface of the slurry exposed to the atmosphere for evaporation. The atmosphere-exposed surface of the slurry is periodically agitated to produce a uniform mixture at the surface from which the suspended particles then begin to settle, yielding the thin film of water. The film thickness increases as the particle settlement progresses, and at some thickness (believed to be on the order of 1 to 2 mils) achieves the optimum for evaporation. Agitation is effected periodically to prevent the formation of a dry surface skin over the slurry or, alternatively, the formation of a heavy layer of water over the surface of the slurry. Liquid containing salt is added to the slurry to maintain the moisture content of the slurry in the preferred range of 200% to 300% (weight of water with respect to weight of solid particles). When the concentration of the salt dissolved in the water within the slurry approaches the saturation level, agitation of the slurry ceases. Complete settlement of the solid particulate matter suspended in the slurry is then permitted. Thereafter, the liquid is decanted from the top of the slurry close to its point of saturation. The liquid thereafter is conventionally processed (by solar evaporation) to cause crystallization of the desired salt.

It is my belief that the unusual evaporative rate is associated with a specific microscopic thickness of water film (believed to be on the order of 1 or 2 mils), and I produce this thickness of film regularly, but temporarily, as the solid particles settle out of the soil/water slurry. Thus, at the instant a given agitation has been accomplished, a uniform mixture of soil particles and water exists throughout the slurry profile. Thereafter, the soil particles, being more dense than water, begin to settle through the water, and, in so doing, yield an ever increasing thickness of clear water covering the slurry. At some point, the thickness of the clear water film is optimum for "unusual" evaporation.

If the settling rate of the solids is less than the unusual evaporative rate, a dry skin will be formed over the slurry; this is the case with thick slurries (high solids content). If the settling rate exceeds the unusual evaporative rate, a clear water film (now subjected to vaporization at the "pan" rate) will form; this is the case with thin slurries (low solids content). It is evident, therefore, that the frequency of agitation should be adjusted to accomodate the settling rate (which may vary if the slurry thickness), and that the optimum frequency of agitation will be directly related to the time required for development of the optimum film thickness.

OTHER OBJECTS AND ADVANTAGES OF THE INVENTION

An object of this invention is to set forth the parameters of solids which can be used in the disclosed process concentrating dissolved salts. According to this aspect of the invention, the solids are selected having a density greater than the density of the saturated water/salt solution.

A further object of this invention is to set forth a preferred density for solids used with this process. Preferably, solids having a density in excess of 2.0 times the density of the saturated solution is preferred.

A further object of this invention is to set forth visual parameters with which the slurry of this invention can be agitated. According to this aspect of the invention, a slurry when placed in a bog is periodically agitated to prevent either the formation of a dry surface skin over the exposed portions of the slurry, or alternatively, the formation of a visible water layer between the water-absorbing atmosphere and submerged and settled solid particulate matter.

An advantage of the parameters herein set forth is that agitation can be carried out in the field without resorting to intricate laboratory testing to determine the thickness of the film undergoing evaporation.

Yet another advantage of the process of this invention is that conventional salt-drying ponds now in use can be converted into the lagoons necessary for the practice of this invention with little modification.

A further advantage of this invention is to permit the production of salt in areas having a low net evaporation/rainfall rate.

Other objects, features and advantages of this invention will become more apparent after referring to the specification.

DESCRIPTION OF THE PREFERRED EMBODIMENTS

Solid particulate matter for the formation of the slurry necessary for the practice of this invention is first selected. Typically, the solid particles should have a density heavier than the density of the saturated water/salt solution. Additionally, it is preferred that the solid have a particulate size which will enable it to pass a 200 mesh sieve (in the range of 0.074 mils). As an example, a conventional bentonite slurry soil mix can be used for this process.

This slurry is typically deposited in its solid form in a shallow lagoon, such as a dried, salt-settling pond. Thereafter, water is sequentially introduced into the pond while the deposited solid is agitated. The result is that a slurry is formed.

Once the slurry is formed, it is preferred to maintain the moisture content of the slurry in the range between 200% moisture content and 300% moisture content. This range is preferred because it has been discovered that in these ranges, maximum evaporation occurs according to the practice of this invention.

Once the slurry mixture has been prepared, typically to the range of 300% moisture content, the entire profile of the slurry is periodically agitated. That is to say, in the case of a shallow lagoon, earth moving equipment is periodically driven across the lagoon in a regular pattern that assures complete coverage of the lagoon area.

A requirement of the periodic agitation of the lagoon by conventional earth moving equipment imposes a practical requirement on the depth of the lagoon. Specifically, the lagoon must have a depth whereby the earth moving equipment can find firm footing for passing through the lagoon and, at the same time, exert sufficient power in forward movement to agitate the contents of the lagoon. Because of this reason, it is required that the depth of the lagoon be no more than 2 feet for most practical earth moving machines; depths of between one and two feet are preferred. Greater depths could be used, however, for specially designed agitating equipment.

The period of agitation of the lagoon depends solely upon the maintenance of the surface layer of 1 to 2 mils thickness of the salt-containing liquid over the particles forming the slurry.

The frequency of agitation can be accurately judged by the physical appearance of the slurry. Agitation should be sufficient to prevent the forming of a visible liquid layer over the surface of the soil particles of the slurry. With the formation of this visible liquid layer, the rate of evaporation drops rapidly down to the pan evaporation rate for the local area.

The preferred frequency of agitation of this invention will not permit the formation of a solid layer over the slurry. However, in the event of the introduction of impurities of low density, a solid layer may form over the slurry. Agitation should be frequent enough to prevent the formation of such a solid layer as it in effect forms a seal preventing the evaporation of water from the slurry through the solid layer to the atmosphere which carries away the water.

As the salt saturation of the slurry increases due to the accelerated evaporation, more solution with salts dissolved therein is introduced. The solutions are introduced to maintain the moisture content of the slurry in the range between 200 and 300%.

The purpose of intermittent agitation responsive to the observed fluid layer over the surfaces of the slurry is continued until the water of the slurry is in a near-saturated condition. At this juncture, agitation ceases and the pond is allowed to settle to form a thick liquid layer over the entire surface of the slurry.

Once the liquid layer is formed over the surface of the slurry, it is decanted. Decantation of the salt-saturated slurry takes place in a conventional manner and the decanted salt-saturated liquid is typically pumped to conventional ponds or apparatus for precipitating out the salt from the near-saturated solution.

The concentrator lagoon is then reflooded to iterate the entire process and periodically yield the near-saturated solution to be decanted.

Example

A 2-acre salt drying pond is filled with a 6-inch layer of bentonite. Salt water from an adjacent ocean-communicated bay is introduced into the salt drying pond to fill the pond to a level of 1.5 feet. A conventional bulldozer is used to agitate the bay or sea water to make a slurry. Thereafter, the operator of the bulldozer is instructed to keep the surface of the slurry sufficiently agitated to prevent either the formation of a visible water layer over the bentonite solid particulate matter and to prevent any impurities present from forming a dry solid surface over the salt drying pond. Bay or sea water is continually added to maintain the salt drying pond at a level of 1.5 feet. Complete agitating coverage of the lagoon with the bulldozer is made every 10 minutes until the specific gravity of the salt water forming the liquid portion indicates that it is almost saturated. Thereafter, agitation is stopped and the slurry allowed to settle for 24 hours. The pond is then decanted to expose the surface of the solid particles of the slurry. Decantation takes place to conventional salt crystallizers where the salt is removed. Once decantation has taken place, the salt pond is again filled with sea or bay water to its original level and the process repeated.

This is the best mode contemplated by me for the practice of my invention at this time.

It will be appreciated that the process disclosed herein will admit of a number of different modifications. The specific provision of driving earth moving machinery through shallow lagoons may be omitted. Likewise, the step of introducing additional liquid into the slurry can be omitted. Conceivably, a slurry can be evaporated in accordance with the technique herein described to the point where the liquid, when decanted, can be subsequently passed to other settling ponds and the like. Other modifications may be made to this invention without departing from the spirit thereof.

I claim:

1. A process for concentrating salt dissolved in a salt-saturated water by accelerated evaporation comprising the steps of providing a particulate solid having a density greater than the salt-saturated water; mixing said particulate solid particles with said liquid containing a salt to form a slurry having a percentage moisture content in the range of up to 300%; periodically agitating said slurry at at least the air-slurry interface to prevent the formation of any visible clear liquid layer over the solid particles of said slurry; after said agitating step, settling said solid particles from the surface of said slurry; and, decanting the surface of said slurry to remove liquid having dissolved salt concentrated therein.

2. The invention of claim 1 further including in said mixing step placing said dry solid particulate matter in a shallow lagoon and adding said salt solution thereto.

3. The invention of claim 1 and wherein said particulate solid particles have a density in the range of at least 2.0 times the density of the salt-saturated water.

4. The process of claim 1 and wherein said particulate solid particles have a size less than 200 mesh.

5. The process of claim 1 and wherein said slurry has a moisture content in the range of 200 to 300% during said agitation step.

6. A process for concentrating salt dissolved in a salt-saturated water by accelerated evaporation comprising the steps of providing a particulate solid having a density greater than the salt-saturated water; mixing said particulate solid particles with said liquid containing a salt to form a slurry having a percentage moisture content in the range of up to 300%; periodically agitating said slurry at at least the air-slurry interface to prevent the formation of any visible solid and dry particulate layer over the slurry; after said agitation step, settling said solid particles from the surface of said slurry; and, decanting the surface of said slurry to remove liquid having dissolved salt concentrated therein.

7. The invention of claim 6 further including in said mixing step placing said dry solid particulate matter in a shallow lagoon and adding said salt solution thereto.

8. The invention of claim 6 and wherein said particulate solid particles have a density in the range of at least 2.0 times the density of the salt-saturated water.

9. The process of claim 6 and wherein sad particulate solid particles have a size less than 200 mesh.

10. The process of claim 6 and wherein said slurry has a moisture content in the range of 200% to 300% during said agitation step.

* * * * *